United States Patent [19]

Winkler et al.

[11] 3,830,664

[45] Aug. 20, 1974

[54] THERMOELECTRIC GENERATOR

[75] Inventors: Josef Winkler, Nurnberg; Dieter Falkenberg, Erlangen, both of Germany

[73] Assignee: Siemens Aktiengesellschaft, Berlin and Munich, Germany

[22] Filed: Apr. 17, 1972

[21] Appl. No.: 244,991

Related U.S. Application Data

[63] Continuation of Ser. No. 868,195, Oct. 21, 1969, abandoned.

[30] Foreign Application Priority Data

Oct. 24, 1968 Germany............................ 1804859

[52] U.S. Cl................... 136/202, 136/208, 136/211

[51] Int. Cl............................................. G21h 1/10

[58] Field of Search..................... 136/202, 208, 211

[56] References Cited

UNITED STATES PATENTS

| | | | |
|---|---|---|---|
| 3,075,030 | 1/1963 | Elm et al. | 136/208 |
| 3,231,965 | 2/1966 | Roes | 136/237 |
| 3,262,820 | 7/1966 | Whitelaw | 136/202 |
| 3,266,944 | 8/1966 | Spira et al. | 136/202 |
| 3,279,955 | 10/1966 | Miller et al. | 136/205 |
| 3,347,711 | 10/1967 | Banks, Jr. et al. | 136/202 |
| 3,401,064 | 9/1968 | Perlow et al. | 136/202 |
| 3,472,702 | 10/1969 | Yeats et al. | 136/202 |
| 3,496,026 | 2/1970 | Mayo | 136/202 |
| 3,510,363 | 5/1970 | Winkler et al. | 136/205 |
| 3,512,736 | 5/1970 | Weber et al. | 136/202 |

*Primary Examiner*—Harvey E. Behrend
*Attorney, Agent, or Firm*—Herbert L. Lerner

[57] ABSTRACT

Thermoelectric generator includes a chamber containing radioactive nuclides as heating source and surrounded by thermocouple elements formed of respective pairs of thermocouple element legs having a hot side facing toward and a cold side facing away from the chamber, and shielding means comprising a pair of telescoped hollow members fully surrounding the chamber, the thermocouple element legs being located in the interior of the inner hollow member of the telescoped pair at locations thereof whereat the walls of the hollow members overlap, the respective pairs of thermocouple element legs being connected at their cold side by a contact bridge which is firmly connected mechanically to the wall of the inner hollow member so that the walls of the hollow members serve as heat exchanger for the cold side of the pairs of thermocouple element legs.

1 Claim, 1 Drawing Figure

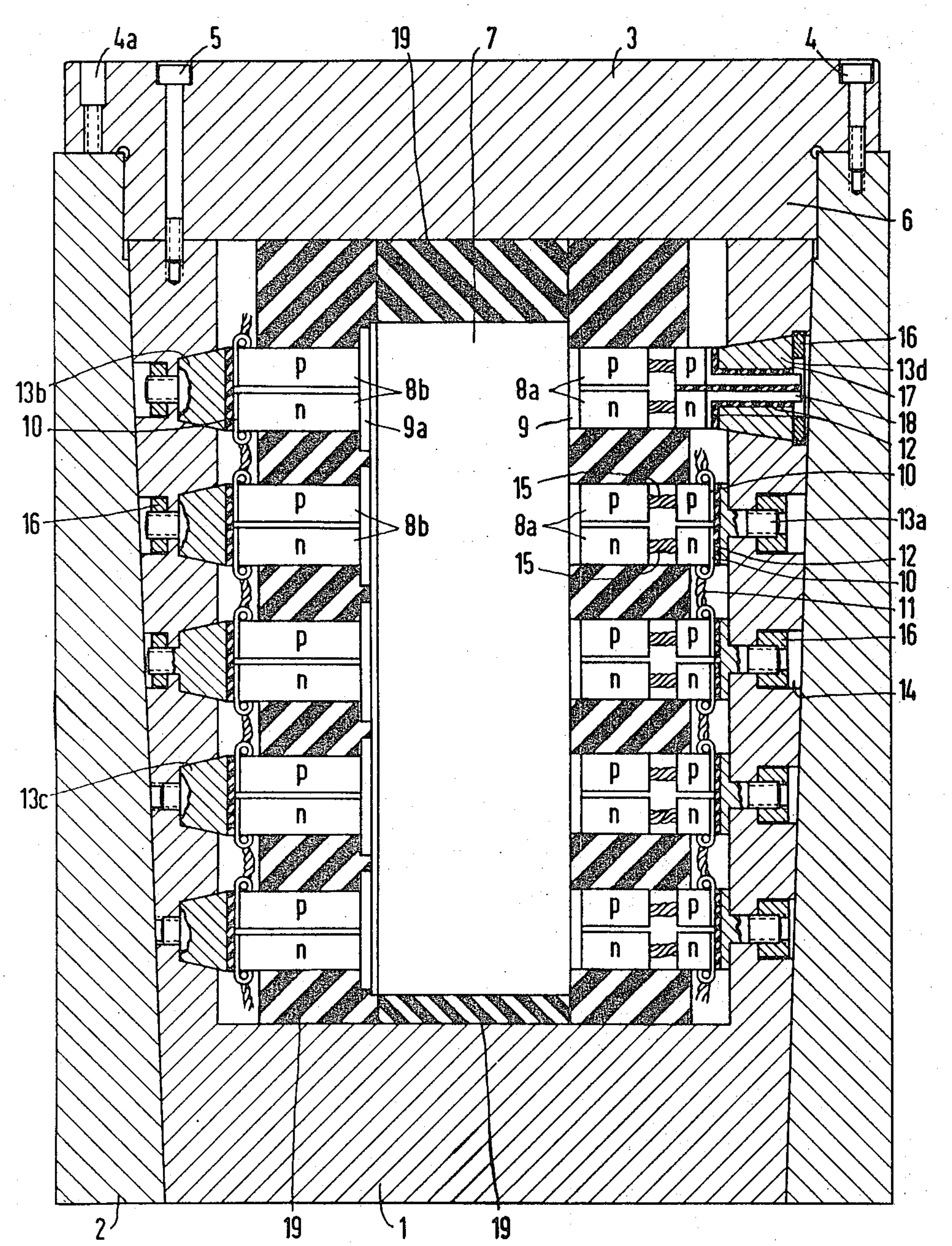
4a
5
19
7
3
4
6
16
13d
17
18
12
10
13a
12
10
11
16
14
13b
10
16
13c
8b
9a
8b
8a
9
15
8a
15
p
n
2
19
1
19

THERMOELECTRIC GENERATOR

This is a continuation, of application Ser. No. 868,195, filed Oct. 21, 1969, now abandoned.

Our invention relates to thermoelectric generator and more particularly to such generator having radioactive nuclides as heat source and a shielding completely surrounding the heat source.

In thermoelectric generators, many thermocouple elements are generally assembled so that their hot and cold soldered locations respectively are located in one surface, namely the hot and cold sides, respectively, of the thermoelectric generator. Each thermocouple element is formed of a pair of thermocouple element legs of, respectively, p and n-conductive thermoelectrically active material. The thermocouple element legs are electrically connected at their hot and cold sides by contact bridges of electrically and thermally conductive material so that all the thermocouple element legs are electrically in series and thermally in parallel. A heat exchanger is generally placed on both the hot and the cold sides of the thermocouple element, respectively, and is separated from the respective control bridges by a layer of thermally conductive and electrically insulating material. The respective heat exchangers accordingly act as heat source and heat sink. The thermally conductive contact between the thermocouple element legs and the respective heat exchanger must be exceptionally good. There should be the least possible thermal resistance in the thermal flow path between the heat source and the hot contact bridges, because the efficiency of the thermoelectric generator depends inter alia thereon.

Since large thermal expansion forces are produced as a result of the operating temperatures in thermoelectric generators, the legs of the thermocouple elements must be firmly fixed locally between the heat exchangers, and provision must be made for compensating the thermal expansion forces in the direction of the longitudinal axis of the thermocouple element legs.

In thermoelectric generators having radioactive nuclides, so-called radio-nuclide generators, a shielding that meets the prescribed conditions for projecting against radiation is necessary. It has been known heretofore to directly surround the nuclide with a shielding. The prescriptions for anti-radiation protection are thereby met. Due to the thickness of the shielding however, a high thermal resistance lies between the heat source (the nuclides) and the hot contact bridges of the legs of the thermocouple elements in these known generators, and the efficiency of such radionuclide generators is not optimal.

It is accordingly an object of our invention to provide a shielding for a radio-nuclide generator constructed in accordance with the prescriptions for anti-radiation protection without impairing the efficiency and operational reliability of the thermoelectric generator.

With the foregoing and other objects in view, we provide, in accordance with our invention, thermoelectric generator having a radioactive nuclide heating source comprising chamber means for containing radioactive nuclides, a plurality of thermocouple elements disposed about the chamber means and respectively comprising a pair of thermocouple element legs having a hot side facing the chamber means and a cold side facing away therefrom, shielding means fully surrounding the chamber means and comprising a pair of telescoped hollow members, the thermocouple element legs being located in the hollow interior of the inner hollow member of the telescoped pair of hollow members at regions thereof whereat the walls of both of the hollow members overlap, and contact bridges interconnecting the legs of each of the pairs of thermocouple element legs at the cold side thereof and firmly connected mechanically to the wall of the inner hollow member so that the walls of the telescoped hollow members serve as heat exchanger for the cold side of the pairs of thermocouple element legs.

Due to the fact that the shielding is the heat exchanger of the cold side of the thermoelectric generator, the hot contact bridges of the legs of the thermocouple elements can be brought into direct heat-conductive contact with the nuclides, and the efficiency of the thermoelectric generator is not impaired. Due to the divided construction of the shielding, two shielding walls overlap one another at the points of attachment of the cold contact bridges of thermocouple element legs. It is thereby possible to locally fix the thermocouple element legs and stably mount them in good heat-conductive contact with the inner shielding wall without reducing the anti-radiation protection. Because of the llocally fixed, stable mounting, slipping of the thermocouple element legs is avoided. Breakdowns, due to short-circuiting of a pair of thermocouple element legs for example, are precluded, and a high operational reliability is assured.

In accordance with further features of our invention, the inner hollow member of the shielding means is pot-shaped and the outer hollow member is substantially hollow cylindrical in form with a cover closing an end thereof.

In accordance with other features of the invention, the pot-shaped inner hollow member and the substantially hollow cylindrical outer member are threadedly connected to one another through the cover of the outer hollow cylindrical member. The cover is provided with a projection extending into the hollow cylindrical outer member and connected by threaded means to the pot-shaped inner member. The outer wall surface of the inner hollow member tapers downwardly from the cover and matches form-lockingly with the inner wall surface of the substantially hollow cylindrical outer member.

According to additional features of our invention, the cold contact bridges of the thermocouple element legs are threadedly connected to the wall of the inner hollow member. More specifically, the cold contact bridges of the thermocouple element legs are provided with bolts extending respectively through an opening formed in the wall of the inner hollow member and are secured by a threaded connection in this wall. At least part of each bolt is fitted into the opening formed in the inner hollow member wall.

Other features which are considered as characteristic for the invention are set forth in the appended claims.

Although the invention is illustrated and described herein as embodied in thermoelectric generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing showing a radio-nuclide generator according to our invention in longitudinal section.

Referring now to the FIGURE, there is shown a radio-nuclide generator having a shielding formed of an inner pot-shaped member 1 fitted in a hollow cylindrical outer member 2. The pot 1 and the hollow cylinder 2 are threadedly connected to one another by screws or bolts 4 and 5 through a cover 3, the screws 4 and 5 being disposed so that they lie substantially perpendicularly to the direction of the radioactive radiation of radio-nuclides contained in the generator. The pot 1 can be withdrawn from the hollow cylinder 2 with the set screw 4*a*. The pot 1, the hollow cylinder 2 and the cover 3 are formed of uranium, lead, steel or another material suitable for anti-radiation protection. The outer wall surface of the pot 1 tapers conically downward away from the cover 3 and is pressed by an extension 6 of the cover 3 into the correspondingly conically formed inner surface of the hollow cylinder 2.

A capsule 7 for radioactive nuclide is located in the interior of the pot 1. The capsule 7 is surrounded by thermocouple elements respectively formed of p and n-conductive thermocouple element legs 8. The legs 8 of each thermocouple element are electrically connected to one another at their hot side by a contact bridge 9. The contact bridges 9 are disposed in direct thermally-conductive or thermally radiating contact with the capsule 7. The material of the contact bridges 9 must have good electrical and thermal conductivity and must, furthermore, have special properties permitting the use thereof at high temperatures. These requirements are met by metal-silicon alloys such as a molybdenum-silicon alloy, for example.

Silver plates 10 are placed on the cold sides of the thermocouple element legs 8. Silver pigtails or braided wire leads 11 are connected between the silver plates 10 of adjacent thermocouple elements, all of the legs of the thermocouple elements being accordingly connected in series.

A layer 12 of electrically insulating and thermally conductive material is applied to the silver plates 10 of the legs 8 of each thermocouple element, and a bolt or pin 13*a* to 13*d* is connected thereby to the silver plates 10. The layer 12, for example, can be metallized on both sides thereof and soldered to the silver plates 10 and the pins 13*a* to 13*d*, respectively. The material of this thermally conductive and electrically insulating layer 12 is aluminum oxide or beryllium oxide or the like. Every pin 13*a* to 13*d* is fastened by a threaded connection in a respective opening 14 formed in the pot 1. In the single FIGURE of the drawing, the radio-nuclide generator of our invention is shown with various different embodiments of devices for fastening the pins 13*a* to 13*d* in the respective openings or bores 14 formed in the wall of the inner hollow member 1, these different embodiments being described hereinafter in greater detail.

It has been mentioned hereinbefore that provision is made in thermoelectric generators for compensating or balancing the thermal expansion forces which are primarily produced in the direction of the longitudinal axis of the thermocouple element legs. In the construction of the thermoelectric generator illustrated in the FIGURE, two different possible ways of effecting compensation of such thermal expansion forces are shown. The respective thermocouple element legs 8a are formed in two p and n-conductive segments each. Since a temperature gradient is present along the thermocouple element legs, it can be advantageous to employ such thermocouple element legs having segments of different thermoelectrically active material in order to make full use of the thermoelectric properties of the materials used. The particular material selected and the particular dimensions determined for the segments are such that the material of each segment is in a temperature range of maximal thermoelectric effectivity. If, for example, the radio-nuclide generator is designed for a hotside temperature of about 1,000°C, the segments of the thermocouple element legs 8*a*, which are directly exposed to the hot-side temperature, are formed of a GeSi-alloy. GeSi-alloys have a maximum thermoelectric effectivity at about 750° to 1,050°C. PbTe or $Bi_2Ti_3/Sb_2Te_3$ can be used as material for the segments of the cold side of the thermocouple element legs 8*a*. These materials have a maximum thermoelectric effectivity at about 200° to 600°C and about 50° to 300°C, respectively. The segments of the respective thermocouple element legs 8a are electrically and thermally conductively connected to each other by flexible connecting members, such as silver pigtails or braided wire leads 15 as shown in the illustrated embodiment. Since the contact bridges 9 are firmly connected to the capsule 7, and the silver plates 10 to the pot 1, the thermocouple elements are thus secured so that they are locally fixed, and the thermal expansion in direction of the longitudinal axes of the legs of the thermocouple elements are compensated or balanced with the aid of the flexible silver pigtails 15.

The thermocouple element legs 8*b* are of solid construction and are threadedly connected through the silver plates 10 with the pot 1. The contact bridges 9*a* on the hot side of the respective pairs of thermocouple element legs 8*b* are not in direct heatconductive contact with the capsule 7, but rather are spaced from the capsule 7, heat transfer therebetween being effected by radiation. In order to maintain the absorption surface for the radiated heat as large as possible, the cross section of the contact bridges 9*a* is larger than the combined cross sections of both p and n-conductive legs 8*b* of each thermocouple element. In the operating condition of the thermoelectric generator, the thermocouple element legs 8*b* can expand in the direction of the longitudinal axes thereof without creating any danger of fracture thereof or disturbing the local fixed attachment of the thermocouple elements. The operational reliability of the thermoelectric generator of our invention is thereby assured by extremely simple means.

It should also be noted that in addition to the illustrated possibilities, other means are available for compensating the thermal expansion forces in the direction of the respective longitudinal axes of the thermocouple element legs. For example, elastic energy storing devices, such as springs, for example, can be provided between the silver plates 10 and the respective pins 13*a* to 13*d* at the cold side of the thermocouple element legs 8*a*, 8*b*, by means of which a thermal expansion of the legs can be compensated or balanced.

A pin 13*a* is mounted at an end of one of the component pairs of the bipartite thermocouple element legs 8*a*, and extends through a through-bore or opening 14 formed in the wall of the pot-shaped inner member 1.

The pin 13*a* is formed with an external thread on which a nut 16 is threaded. The pins 13*b* and 13*c*, that are mounted on silver plates 10 of the thermocouple element legs 8*b* are of partly frustroconical shape flaring outwardly in direction toward the silver plates 10. The frustroconical portion of these pins 13*b* and 13*c* is fitted in a corresponding frustroconically shaped portion of the through-bore or opening 14 formed in the wall of the pot 1. By this means, the heat transfer surface between the pot 1 and the pins 13*b* and 13*c* is maximized, and the thermal resistance therebetween minimized. The pins 13*b* have an externally threaded portion and, like the aforedescribed pins 13*a*, nuts 16 are screwed thereon, respectively, so as to fasten them to the wall of the pot-shaped inner member 1. The pins 13*c* have an externally threaded portion that is threadedly secured in a conforming internal thread of the through-bore 14 formed in the wall of the pot-shaped inner member 1.

Another modified means for fastening respective thermocouple elements to the pot-shaped inner member are the pins 13*d* which are mounted on the silver plates 10 and are of frustroconical shape tapering down in direction toward the silver plates 10. The pin 13*d* is forced by the aid of a nut 16 into the throughbore 14 formed in the wall of the pot 1, thereby providing a very large heat transfer surface between the thermocouple element legs 8*a* and the pot 1. In addition, a bore 17 is formed in the pin 13*d*, and connecting fins 17 extend from the silver plates 10 outwardly through the bore 17. The electrically conductive connection between adjacent thermocouple elements in the just-described modification is effected by silver pigtails or braided wire leads which extend between the adjacent thermocouple elements in suitable grooves (not illustrated) formed in the wall of the pot 1. The particular shape of the pin 13*d* and the outwardly extending connecting fins 18 permit the insertion of the thermocouple element in the through-bore 17 from the outside of the pot 1 and convenient removal thereof therefrom without having to enter into the interior of the pot 1. In a hot laboratory, the exchange or replacement of thermocouple elements can thus be effected during operation of the thermoelectric generator. It should also be noted that the thermocouple legs 8*a* and 8*b* and the parts of the capsule 7 which, respectively, do not engage the contact bridges 9 nor make thermal radiation contact with the contact bridges 9*a* are surrounded by any suitable heat-insulating material 19, such as for example the material known by the trade name "Min-*k*".

In summary, it should be emphasized that in the radio-nuclide generator according to our invention, we provide a shielding which is not penetrated by any rectilinear bores that would otherwise permit the passage of radiation through the shielding virtually unhindered although the cold contact bridges of the thermocouple element legs 8*a* and 8*b* are fastened in the sheilding. With suitable dimensioning, the prescribed requirements for effecting anti-radiation protection are capable of being fulfilled with this shielding, and the efficiency of the thermoelectric generator of our invention is not affected thereby. Moreover, relatively simplified assembly of the thermocouple element legs in the interior of the pot-shaped inner shielding member 1 is rendered possible due to the fact that the threaded connection can be effected with the aid of nuts at the outer wall of the pot-like inner member 1.

We claim:

1. Thermoelectric generator comprising chamber means for containing radioactive nuclide as heating source, a plurality of thermocouple elements disposed about said chamber means and respectively comprising a pair of thermocouple element legs having a hot side facing said chamber means and a cold side facing away therefrom, shielding means fully surrounding said chamber means and comprising an enclosure formed of a pair of tightly fitted telescoped hollow members having overlapping walls, a cover closing one end of the outer telescoped hollow member, the outer lateral surface of the inner member having a frustroconical shape tapering downwardly in direction from said cover thereof and form-lockingly fitted in a corresponding inner frustroconical surface of the outer member, the inner telescoped hollow member having a hollow interior and a bottom wall, said thermocouple element legs being located in said hollow interior of said inner hollow member of said telescoped pair of hollow members and extending radially therein substantially about an entire region thereof whereat the walls of both of said hollow members overlap, and respective contact bridges connecting one leg of adjacent pairs of thermocouple element legs to another at said cold side thereof, means firmly connecting said thermocouple element legs mechanically at said cold side thereof to the wall of said inner hollow member, said thermocouple element legs extending into said hollow interior at said hot side thereof, the walls of said telescoped hollow members serving as heat exchanger for said cold side of said pairs of thermocouple element legs, and second contact bridges interconnecting the legs of each of said pairs of thermocouple element legs at the hot side thereof, said second contact bridges being spaced from but directly exposed to heat radiation from the chamber means and, thus, serving as heat exchanger for the hot side of the pairs of thermocouple element legs, each of the second contact bridges and the adjacent portion of the thermocouple element legs connect thereto being free of firm mechanical connection to any other part of the generator.

* * * * *